(12) United States Patent
Nishino et al.

(10) Patent No.: US 8,507,134 B2
(45) Date of Patent: Aug. 13, 2013

(54) ANODE MATERIAL AND BATTERY USING THE SAME

(75) Inventors: Takatomo Nishino, Tokyo (JP); Hiroaki Tanizaki, Miyagi (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 1887 days.

(21) Appl. No.: 10/664,446

(22) Filed: Sep. 18, 2003

(65) Prior Publication Data

US 2004/0131938 A1 Jul. 8, 2004

(30) Foreign Application Priority Data

Sep. 17, 2002 (JP) ................ P2002-270366

(51) Int. Cl.
*H01M 4/134* (2010.01)
*H01M 4/136* (2010.01)
(52) U.S. Cl.
USPC .................................... 429/231.1; 429/231.8
(58) Field of Classification Search
USPC ................. 429/218.1, 231.8, 231.3
See application file for complete search history.

(56) References Cited

U.S. PATENT DOCUMENTS

| | | | | |
|---|---|---|---|---|
| 6,171,725 | B1 * | 1/2001 | Suzuki et al. | 429/218.1 |
| 6,350,544 | B1 * | 2/2002 | Takami et al. | 429/231.4 |
| 6,413,672 | B1 * | 7/2002 | Suzuki et al. | 429/231.95 |
| 6,432,585 | B1 * | 8/2002 | Kawakami et al. | 429/233 |
| 6,506,520 | B1 * | 1/2003 | Inoue et al. | 429/231.95 |

OTHER PUBLICATIONS

Hawley's Condensed Chemical Dictionary, 11$^{th}$ edition, p. 1217, 1987.*

* cited by examiner

*Primary Examiner* — Tracy Dove
(74) *Attorney, Agent, or Firm* — Dentons US LLP

(57) ABSTRACT

Provided are an anode material capable of improving a capacity and cycle characteristics, and a battery using the anode material. A disk-shaped cathode contained in a package can and a disk-shaped anode contained in a package cup are laminated with a separator in between. The anode comprises a composite material formed through applying a compressive force and a shearing force to at least a part of a surface of a base material including at least one kind selected from Group 14 elements except for carbon so as to combine a carbonaceous material with the base material, thereby the capacity and the cycle characteristics can be improved.

10 Claims, 1 Drawing Sheet

US 8,507,134 B2

ANODE MATERIAL AND BATTERY USING THE SAME

RELATED APPLICATION DATA

The present application is based on Japanese Application(s) No(s). P2002-270366 filed Sep. 17, 2002, which application(s) is/are incorporated herein by reference to the extent permitted by law. Priority under 35 U.S.C. §119 is not claimed.

BACKGROUND OF THE INVENTION

1. Field of the Invention

The present invention relates to a battery using, for example, lithium (Li) as a battery reacting species, and an anode material used in the battery.

2. Description of the Related Art

In recent year, in accordance with downsizing of electronic devices, a development of secondary batteries having a high energy density has been in demand. A secondary battery which meets the demand is a lithium secondary battery. However, in the lithium secondary battery, lithium is deposited on an anode to form a lithium dendrite during charge, thereby the lithium is inactivated, so there is a problem that the cycle life of the lithium secondary battery is short. Therefore, lithium-ion secondary batteries with improved cycle characteristics have been commercially available.

The lithium-ion secondary battery uses a graphite material which uses a intercalation reaction of lithium between graphite layers, or a carbonaceous material which uses an application of insertion/extraction reactions of lithium in pores, thereby lithium is not deposited to form a dendrite, and as described above, the cycle life of the lithium-ion secondary battery is longer. Moreover, the graphite material and the carbonaceous material are stable in air, so the lithium-ion secondary battery has a big advantage in industrial production.

However, in the graphite material, an anode capacity has an upper limit stipulated by the composition $C_6Li$ of a first stage graphite intercalation compound. Moreover, in the carbonaceous material, it is industrially difficult to control a minute pore structure thereof, and when the number of pores is increased, specific gravity of the carbonaceous material declines, so the anode capacity per unit volume cannot be improved. Further, it is known that some low-temperature sintered carbonaceous materials exhibit an anode discharge capacity exceeding 1000 mAh/g. However, when the battery comprises a metal oxide or the like having a large capacity at a noble potential of 0.8 V or over against lithium metal as a cathode, a discharge voltage declines. Because of these problems, it is considered that it is difficult for existing carbonaceous materials to meet a demand for a longer operating time of future electronic devices or a higher energy density of power sources. Therefore, a development of an anode active material having superior capability to insert and extract lithium has advanced.

As such an anode active material capable of achieving a higher capacity, for example, a material which can form an alloy with lithium such as zinc (Zn), cadmium (Cd), lead (Pb), tin (Sn), bismuth (Bi), silicon (Si), indium (In), antimony (Sb) or germanium (Ge), or a Li—Al alloy has been widely researched. Moreover, an anode using a Si alloy as the anode active material has been invented (refer to U.S. Pat. No. 4,950,566).

However, these anode active materials are expanded or shrunk in accordance with charge and discharge, thereby resulting in the materials being pulverized, so the cycle characteristics of the battery declines.

Therefore, in order to improve the cycle characteristics, an anode active material in which an element not involved in expansion and shrinkage in accordance with insertion and extraction of lithium is substituted for a part has been proposed. For example, $LiSi_vO_w$ ($0 \leq v$, $0 < w < 2$) (refer to Japanese Unexamined Patent Application Publication No. Hei 6-325765), $Li_xSi_{1-y}M_yO_z$ (M represents metal except for alkali metal or metalloid except for silicon; $0 \leq x$, $0 < y < 1$, $0 < z < 2$)(refer to Japanese Unexamined Patent Application Publication No. Hei 7-230800), and a Li—Ag—Te alloy (refer to Japanese Unexamined Patent Application Publication No. Hei 7-288130) have been proposed. However, even if any of these anode active materials is used, a decline in the cycle characteristics resulting from expansion and shrinkage of the alloys is large, so the fact is that full advantage cannot be taken of the characteristic, that is, a higher capacity.

Moreover, an anode active material using a compound including an Group 4B element except for carbon and one or more kinds of nonmetal elements has been proposed (refer to Japanese Unexamined Patent Application Publication No. Hei 11-102705), however, also in the anode active material, a decline in the cycle characteristics is large. Therefore, an anode using a mixture of metal or an alloy capable of forming an alloy with lithium and a carbonaceous material such as carbon fiber, carbon black or the like so as to be able to achieve a higher capacity and superior cycle characteristics has been developed (refer to Japanese Unexamined Patent Application Publication No. 2001-196052).

However, when the metal or the alloy capable of forming an alloy with lithium and the carbonaceous material are simply mixed, the rate of presence of the metal or the alloy capable of forming an alloy with lithium in the anode is reduced by the amount of the carbonaceous material mixed, so the capacity declines. Further, sufficient cycle characteristics cannot be obtained.

SUMMARY OF THE INVENTION

In view of the foregoing, it is an object of the invention to provide an anode material capable of improving a capacity and cycle characteristics, and a battery using the anode material.

An anode material according to the invention comprises a composite material formed through applying a compressive force and a shearing force to at least a part of a surface of a base material including at least one kind selected from Group 14 elements except for carbon (C) so as to combine a carbonaceous material with the base material.

A battery according to the invention comprises a cathode, an anode and an electrolyte, wherein the anode comprises a composite material formed through applying a compressive force and a shearing force to at least a part of a surface of a base material including at least one kind selected from Group 14 elements except for carbon so as to combine a carbonaceous material with the base material.

In the anode material according to the invention, the composite material is formed through applying a compressive force and a shearing force so as to combine the carbonaceous material with the base material, so unlike the case where the base material and the carbonaceous material are simply mixed so that the carbonaceous material is adhered to the base material, the carbonaceous material is firmly adhered to the base material, thereby a decline in the cycle characteristics by the base material can be prevented by the carbonaceous material. Thereby, the ratio of the base material in the anode can be increased, so a higher capacity can be obtained.

In the battery according to the invention, the anode material according to the invention is used, so a higher capacity and superior cycle characteristics can be obtained.

Other and further objects, features and advantages of the invention will appear more fully from the following description.

DETAILED DESCRIPTION OF THE PREFERRED EMBODIMENTS

Figure 1:
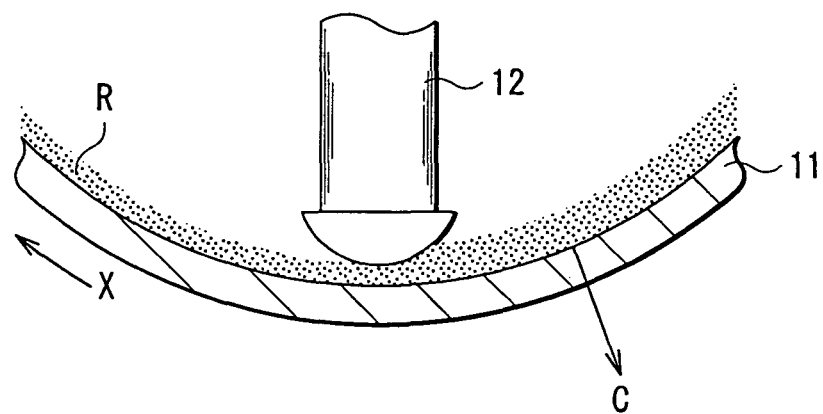
FIG. 1 is a sectional view of an example of an apparatus used to produce an anode material according to an embodiment of the invention.

Preferred embodiments of the invention will be described in more detail below referring to the accompanying drawings.

An anode material according to an embodiment of the invention comprises a composite material as an anode active material. The composite material is formed through applying a compressive force and a shearing force to at least a part of a surface of a base material including at least one kind selected from Group 14 elements in the long form of the periodic table of the elements except for carbon so as to combine a carbonaceous material with the base material. It is considered that when a compressive force and a shearing force are applied to combine the carbonaceous material, the base material and the carbonaceous material are brought nearest to each other, and are physically bonded by van der Waals forces, thereby the composite material is formed. Therefore, unlike the case where the base material and the carbonaceous material are simply mixed to be adhered to each other, the carbonaceous material is firmly adhered to the base material, so the carbonaceous material can prevent a decline in the cycle characteristics due to the base material. Moreover, the ratio of the base material in an anode 24 which will be described later can be increased, so a higher capacity can be obtained.

More specifically, as the base material, silicon, germanium, tin or lead, an alloy thereof, or a compound thereof is cited. Among them, a base material including at least either silicon or tin is preferable, because it can form an alloy with lithium or the like, and has large capability to insert and extract lithium. In the specification of the invention, an alloy means not only an alloy including two or more kinds of metal elements but also an alloy including one or more kinds of metal elements and one or more kinds of metalloid elements. As the composition of the alloy, a solid solution, a eutectic (eutectic mixture), an intermetallic compound or the coexistence of two or more kinds selected from them is cited.

As the alloy or the compound, for example, an alloy or a compound represented by a chemical formula $Ma_pMb_q$ is cited. In the chemical formula, Ma represents at least one kind selected from Group 14 elements except for carbon, and Mb represents at least one kind selected from elements except for Ma. The values of p and q are $p>0$ and $q>0$, respectively.

Specifically, when Ma is at least either silicon or tin, Mb preferably includes at least one kind selected from transition elements in the fourth period, that is, scandium (Sc), titanium (Ti), vanadium (V), chromium (Cr), manganese (Mn), iron (Fe), cobalt (Co), nickel (Ni), copper (Cu) and zinc (Zn), because a change in form according to alloying and decomposition can be inhibited. Further, Mb preferably includes at least one kind selected from the group consisting of Group 13 elements in the long form of the periodic table of the elements except for thallium (Tl), and silver (Ag), and more preferably includes it in addition to at least one kind selected from transition elements in the fourth period, because the reversibility of charge and discharge can be improved. The Group 13 elements except for thallium include boron (B), aluminum (Al), gallium (Ga) and indium (In), and at least one kind selected from them is included in Mb.

More specifically, as such an alloy or such a compound, for example, $Sc_5Sn_3$, $ScSi$, $Ti_6Sn_5$, $TiSi_2$, $SnV_3$, $VSi_2$, $Cr_2Sn_3$, $CrSi_2$, $Mn_2Sn$, $MnSi_2$, $FeSn$, $FeSn_2$, $Fe_3Si$, $FeSi_2$, $CoSn$, $CoSn_2$, $Co_3Sn_2$, $CoSi_2$, $NiSn$, $NiSi_2$, $Ni_2Si$, $CuSn$, $Cu_3Sn$, $Cu_6Sn_5$, $CuSi_2$, $Mg_2Si$, $Mg_2Sn$, $ZnSi_2$, $NbSi_2$, $MoSi_2$, $WSi_2$, $Cu_6InSi_3$, $Cu_6In_2Si_3B$, $Cu_6Sn_2In$, $Cu_6InSi_3Ag$, $CuSnP$, $CoCu_2Sn$, $CoSn_2Al$, $CuSiAl$, $SiAlFe$, $CO_2MnSn$, $CoNiSn$, $CrCu_2Sn$, $Cu_2FeSn$, $CuMgSn$, $Cu_2MnSn$, $Cu_4MnSn$, $Cu_2NiSn$, $MgNi_2Sn$, $MnNi_2Sn$ or the like is cited.

As the carbonaceous material, for example, acetylene black, artificial graphite or carbon fiber is preferable, and at least one kind or a mixture of two or more kinds selected from them is used. It is because an effect of lithium diffusion into the anode 24 can be improved by combining these materials having a relatively larger surface area than the base material, and conductivity in the anode 24 can be secured.

As the mass ratio of the base material and the carbonaceous material in the composite material is preferably within a range from 0.1 to 8.0 inclusive for the carbonaceous material relative to 100 for base material, because the capacity and the cycle characteristics can be improved within the range.

More specifically, such an anode material can be formed through the following steps.

At first, the base material and the carbonaceous material such as carbon black, artificial graphite, carbon fiber or the like are produced by a known method. Next, for example, a compressive force and a shearing force are applied to at least a part of a surface of the base material to combine the carbonaceous material with the base material. At this time, various apparatuses can be used. FIG. 1 shows one of the apparatuses as an example. In the apparatus, a material R put into a vessel 11 rotating in an X direction is pressed against an inner wall of the vessel 11 by centrifugal force C so as to be fixed, and the material R is compressed and sheared between the vessel 11 and a compressing bar 12. Thus, the anode material according to the embodiment can be obtained.

Moreover, the anode material may include another anode active material powder in addition to the composite material. As the anode active material, a carbonaceous material, a metal oxide and a high molecular weight material each of which is capable of inserting and extracting lithium are cited. As the carbonaceous material, for example, in addition to carbon fiber, acetylene black and artificial graphite which are described above, non-graphitizable carbon, natural graphite, kinds of pyrolytic carbon, kinds of coke, kinds of graphite, kinds of glass-like carbon, a sintered high molecular weight organic compound body, activated carbon, and any other kinds of carbon black are cited. Among them, kinds of coke include pitch coke, needle coke, petroleum coke and so on, and the sintered high molecular weight organic compound body is a high molecular weight material such as a phenolic resin, a furan resin or the like which is carbonized through sintering at an adequate temperature. Further, as the metal oxide, tin oxide ($SnO_2$) or the like is cited, and as the high molecular weight material, polyacetylene, polyparaphenylene or polythiophene is cited.

The anode material is used for an anode of the following secondary battery. Herein, a battery using lithium as an electrode reacting species will be described below.

Figure 2:
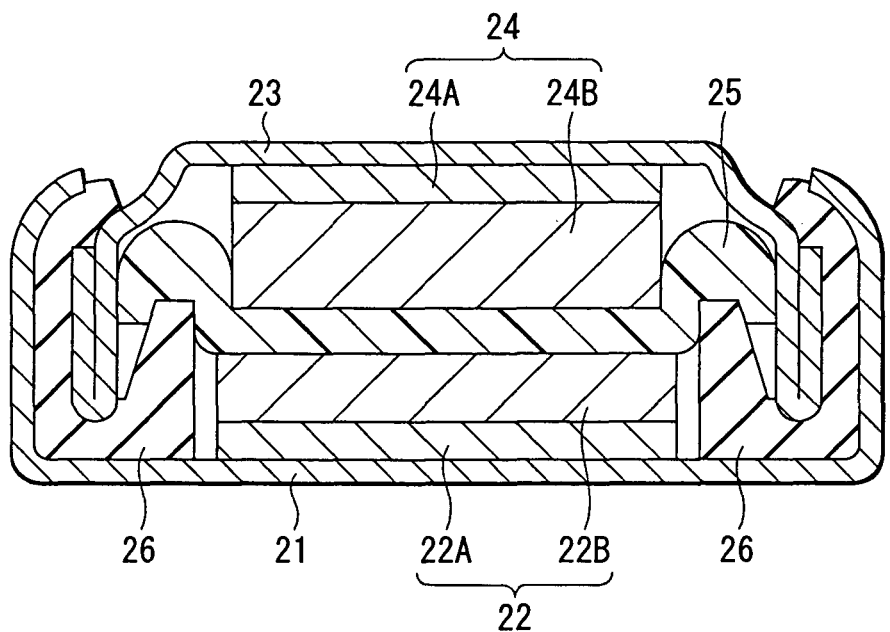
FIG. 2 is a sectional view of a secondary battery using the anode material according to the embodiment of the invention.

FIG. 2 shows a sectional view of a secondary battery using the anode material according to the embodiment. The secondary battery is a so-called coin type, and comprises a laminate including a disk-shaped cathode 22 contained in a package can 21 and a disk-shaped anode 24 contained in a package cup 23 with a separator 25 in between. Edge portions of the package can 21 and the package cup 23 are sealed through caulking by a gasket 26. The package can 21 and the package cup 23 are made of, for example, metal such as stainless, aluminum or the like.

The cathode 22 includes, for example, a cathode current collector 22A and a cathode mixed layer 22B disposed on the cathode current collector 22A. The cathode current collector 22A is made of, for example, metal foil such as aluminum foil, nickel foil, stainless foil or the like. The cathode mixed layer 22B includes, for example, a cathode material capable of inserting and extracting lithium as a cathode active material, and if necessary, an electronic conductor such as carbon black, graphite or the like, and a binder such as polyvinylidene fluoride or the like. As the cathode material capable of inserting and extracting lithium, for example, metal oxide, metal sulfide, a specific high molecular weight material or the like is preferable, and one kind or two or more kinds are selected from them depending upon the purpose of the uses of the battery.

As the metal oxide, a lithium complex oxide represented by $Li_aMIO_2$, a phosphor oxide represented by $Li_bMIIPO_4$, or $V_2O_5$ is cited. The lithium complex oxide is more preferable, because the lithium complex oxide can generate a high voltage, and can increase the energy density. In the above formulas, MI and MII represent one or more kinds selected from transition elements, and more specifically, at least one kind selected from the group consisting of cobalt, nickel, manganese and iron is preferable as MI and MII. Moreover, the lithium complex oxide or the phosphor oxide in which non-transition metal such as lithium, aluminum, magnesium or the like is substituted for a part of MI or MII is preferably used. The values of a and b depend upon charge-discharge conditions of the battery, and are generally within a range of $0.05 \leq a \leq 1.15$ and $0 \leq b \leq 1.10$, respectively. More specifically, as such a lithium complex oxide and such a phosphor oxide, $Li_cCoO_2$, $Li_cNiO_2$, $Li_cNi_dCo_{1-d}O_2$, $Li_eFe_{1-f}Mn_fPO_4$, $Li_gMn_2O_4$ having a spinel structure, or the like is cited. In the above formulas, the values of c, d, e, f and g depend upon charge-discharge conditions of the battery, and are generally within a range of $0.05<c<1$, $0.7<d<1$, $0<e<1$, $0<f<0.8$, and $0<g<1.1$, respectively.

As the metal sulfide, $TiS_2$, $MoS_2$ or the like is cited, and as the high molecular weight material, polyaniline, polypyrrole or the like is cited. Further, in addition to these cathode materials, in $NbSe_2$ can be used.

The anode 24 includes, for example, an anode current collector 24A, and an anode mixed layer 24B disposed on the anode current collector 24A. The anode current collector 24A is made of, for example, metal foil such as copper foil, nickel foil, stainless foil or the like.

The anode mixed layer 24B includes, for example, the anode material according to the embodiment, and if necessary a binder such as polyvinylidene fluoride or the like. Further, the anode mixed layer 24B may further include any other material such as an electronic conductor in addition to the anode material according to the embodiment.

The separator 25 isolates between the cathode 22 and anode 24 so as to pass lithium ions through while preventing a short circuit of a current due to the contact between the cathode 22 and the anode 24. The separator 25 comprises, for example, a porous film made of a synthetic resin such as polytetrafluoroethylene, polypropylene, polyethylene or the like, or a porous film made of an inorganic material such as nonwoven fabric made of a ceramic, and may comprise a laminate including two or more kinds selected from these porous films.

The separator 25 is impregnated with an electrolyte solution which is a liquid electrolyte. The electrolyte solution includes, for example, a solvent and lithium salt which is electrolyte salt. The solvent dissolves and dissociates the electrolyte salt. As the solvent, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is cited, and one kind or a mixture of two or more kinds selected from them may be used.

As the lithium salt, for example, lithium hexafluorophosphate ($LiPF_6$), lithium perchlorate ($LiClO_4$), lithium hexafluoroarsenate ($LiAsF_6$), lithium tetrafluoroborate ($LiBF_4$), lithium trifluoromethane sulfonate ($LiCF_3SO_3$) or lithium bis(trifluoromethane-sulfonyl)imide ($LiN(CF_3SO_2)_2$) is cited, and one kind or a mixture of two or more kinds selected from them may be used.

The secondary battery can be manufactured through the following steps, for example.

At first, for example, the cathode material, the electronic conductor and the binder are mixed to prepare a cathode mixture, then the cathode mixture is dispersed in a solvent such as N-methyl-2-pyrrolidone or the like to form cathode mixture slurry. Next, after the cathode mixture slurry is applied to the cathode current collector 22A, and the solvent is dried, the cathode mixed layer 22B is formed through compression molding, and the cathode current collector 22A on which the cathode mixed layer 22B is formed is stamped into a predetermined shape so as to form the cathode 22.

Next, for example, the anode material and the binder are mixed to prepare an anode mixture, then the anode mixture is dispersed in a solvent such as N-methyl-2-pyrrolidone or the like to form anode mixture slurry. Next, after the anode mixture slurry is applied to the anode current collector 24A, and the solvent is dried, the anode mixed layer 24B is formed through compression molding, and the anode current collector 24A on which the anode mixed layer 24B is formed is stamped into a predetermined shape so as to form the anode 24.

After that, for example, the anode 24, the separator 25 impregnated with the electrolyte solution, and the cathode 22 are laminated, and are contained in the package cup 23 and the package can 21, then the package cup 23 and the package can 21 are caulked. Thereby, the secondary battery shown in FIG. 2 is obtained.

The secondary battery works as follows.

When the secondary battery is charged, lithium ions are extracted from the cathode 22, and are inserted into the anode 24 through the electrolyte solution. When the secondary battery is discharged, for example, lithium ions are extracted from the anode 24, and are inserted into the cathode 22 through the electrolyte solution. In the secondary battery, the anode material including the composite material formed through applying the compressive force and the shearing force to at least a part of the surface of the base material including at least one kind selected from Group 14 elements except for carbon to combine the carbonaceous material with the base material is used, so the characteristics of the anode 24 are improved, and a higher capacity and superior cycle characteristics can be obtained.

Thus, as the anode material according to the embodiment uses the composite material formed through applying the compressive force and the shearing force to at least a part of the surface of the base material including at least one kind selected from Group 14 elements except for carbon to combine the carbonaceous material with the base material, so the carbonaceous material can prevent a decline in the cycle characteristics by the base material. In other words, the cycle characteristics can be improved. Thereby, the ratio of the base material in the anode 24 can be increased, so the capacity can be improved. Therefore, when the anode material is used, a secondary battery having a higher capacity and superior cycle characteristics can be obtained.

More specifically, when the base material includes at least one kind selected from the group consisting of scandium, titanium, vanadium, chromium, manganese, iron, cobalt, nickel, copper, zinc, boron, aluminum, gallium, indium and silver, a change in form according to alloying and decomposition can be inhibited, and charge-discharge reversibility can be improved.

Moreover, when the mass ratio of the base material and the carbonaceous material in the composite material is within a range of 0.1 to 8.0 inclusive for the carbonaceous material relative to 100 for the base material, the capacity and the cycle characteristics can be further improved.

EXAMPLES

Next, specific examples of the invention will be described in detail below.

Examples 1 through 15

At first, tin (a first element; a Group 14 element except for carbon) and one kind selected from the group consisting of cobalt, iron and copper (a second element; a transition element in the fourth period) were put into a high-frequency melting furnace at a ratio shown in Table 1 so as to form a molten mixture, then the mixture was sprayed in an argon atmosphere to obtain mixture powders. The obtained powders were classified to obtain the base material with an average particle diameter of 15 μm. Next, the base material and the carbonaceous material, that is, acetylene black (DENKA BLACK manufactured by Denki Kagaku Kogyo Kabushiki Kaisha), artificial graphite (KS-4 manufactured by Timcal Ltd.) or carbon fiber (vapor phase carbon fiber manufactured by Showa Denko K.K.) were put into an apparatus called Mechanofusion AMS-Lab manufactured by Hosokawa Micron Corporation. Then, the load power of the apparatus was adjusted to be 1.5 kW, and the apparatus was driven for 30 minutes to apply a compressive force and a shearing force to at least a part of the surface of the base material. Thereby the carbonaceous material was combined with the base material so as to form the composite material. At that time, 1.5 kg of the base material was used, and the mass ratio of the base material and the carbonaceous material in the composite material was a value shown in Table 1 for the carbonaceous material relative to 100 for the base material.

TABLE 1

| | BASE MATERIAL | | | | | FIRST | 100TH CYCLE |
| | FIRST ELEMENT | | SECOND ELEMENT | | CARBONACEOUS MATERIAL | CYCLE DISCHARGE | CAPACITY RETENTION |
| | KIND | RATIO (WT %) | KIND | RATIO (WT %) | KIND | MASS RATIO | CAPACITY (mAh) | RATIO (%) |
|---|---|---|---|---|---|---|---|---|
| EXAMPLE 1 | Sn | 70 | Co | 30 | ACETYLENE BLACK | 0.05 | 9.6 | 84.2 |
| EXAMPLE 2 | Sn | 70 | Co | 30 | ACETYLENE BLACK | 0.1 | 13.2 | 90.1 |
| EXAMPLE 3 | Sn | 70 | Co | 30 | ACETYLENE BLACK | 1.0 | 14.1 | 93.8 |
| EXAMPLE 4 | Sn | 70 | Co | 30 | ACETYLENE BLACK | 3.0 | 12.8 | 94.5 |
| EXAMPLE 5 | Sn | 70 | Fe | 30 | ACETYLENE BLACK | 1.0 | 13.7 | 94.2 |
| EXAMPLE 6 | Sn | 45 | Cu | 55 | ACETYLENE BLACK | 1.0 | 12.8 | 91.8 |
| EXAMPLE 7 | Sn | 70 | Co | 30 | ARTIFICIAL GRAPHITE | 1.0 | 12.2 | 94.8 |
| EXAMPLE 8 | Sn | 70 | Co | 30 | ARTIFICIAL GRAPHITE | 8.0 | 10.8 | 95.3 |
| EXAMPLE 9 | Sn | 70 | Co | 30 | ARTIFICIAL GRAPHITE | 10.0 | 9.5 | 96.1 |
| EXAMPLE 10 | Sn | 70 | Fe | 30 | ARTIFICIAL GRAPHITE | 1.0 | 12.9 | 94.1 |
| EXAMPLE 11 | Sn | 45 | Cu | 55 | ARTIFICIAL GRAPHITE | 10 | 11.2 | 92.1 |
| EXAMPLE 12 | Sn | 70 | Co | 30 | CARBON FIBER | 0.1 | 12.9 | 92.8 |
| EXAMPLE 13 | Sn | 70 | Co | 30 | CARBON FIBER | 1.0 | 13.6 | 93.5 |
| EXAMPLE 14 | Sn | 70 | Fe | 30 | CARBON FIBER | 1.0 | 13.8 | 93.4 |
| EXAMPLE 15 | Sn | 45 | Cu | 55 | CARBON FIBER | 1.0 | 11.7 | 91.2 |

TABLE 1-continued

| | BASE MATERIAL | | | | CARBONACEOUS MATERIAL | | FIRST CYCLE DISCHARGE CAPACITY (mAh) | 100TH CYCLE CAPACITY RETENTION RATIO (%) |
| | FIRST ELEMENT | | SECOND ELEMENT | | | | | |
| | KIND | RATIO (WT %) | KIND | RATIO (WT %) | KIND | MASS RATIO | | |
|---|---|---|---|---|---|---|---|---|
| COMPARATIVE EXAMPLE 1 | Sn | 70 | Co | 30 | — | 0 | 9.3 | 81.5 |
| COMPARATIVE EXAMPLE 2 | Sn | 70 | Fe | 30 | — | 0 | 9.0 | 81.8 |
| COMPARATIVE EXAMPLE 3 | Sn | 45 | Cu | 55 | — | 0 | 8.5 | 80.5 |

Next, the secondary battery using each of the obtained composite materials of Examples 1 through 15 was formed. The secondary battery had the same shape as the secondary battery shown in FIG. 2. Therefore, the description will be given referring to FIG. 2, and like numerals are used to denote like components.

At first, lithium carbonate ($Li_2CO_3$) and cobalt carbonate ($CoCO_3$) were mixed at a ratio (molar ratio) of $Li_2CO_3$:$CoCO_3$=0.5:1, and the mixture was sintered in air at 900° C. for 5 hours to obtain lithium cobalt oxide ($LiCoO_2$) which was the cathode active material. Next, 91 part by weight of lithium cobalt oxide, 6 parts by weight of graphite as an electronic conductor and 3 parts by weight of polyvinylidene fluoride as a binder were mixed to prepare a cathode mixture. Then, the cathode mixture was dispersed in N-methyl-2-pyrrolidone as a solvent to form cathode mixture slurry. After the cathode mixture slurry was applied to the cathode current collector 22A made of aluminum, and was dried, the cathode mixed layer 22B was formed through compression molding by a roller press. After that, the cathode current collector 22A on which the cathode mixed layer 22B was formed was stamped into a disk shape with a diameter of 15.5 mm so as to form the cathode 22.

Next, 60 parts by weight of the obtained composite material, 30 parts by weight of artificial graphite as an electronic conductor and 10 parts by weight of polyvinylidene fluoride as a binder were mixed to prepare an anode mixture. Then, the anode mixture was dispersed in N-methyl-2-pyrrolidone as a solvent to form anode mixture slurry. After the anode mixture slurry was applied to the anode current collector 24A made of copper, and was dried, the anode mixed layer 24B was formed through compression molding by a roll press. After that, the anode current collector 24A on which the anode mixed layer 24B was formed was stamped into a disk shape with a diameter of 15.5 mm so as to form the anode 24.

After the cathode 22 and the anode 24 were formed, the anode 24 and the separator 25 made of a porous polypropylene film with a thickness of 25 μm were laminated in order in a central portion of the package cup 23, and the electrolyte solution was injected into the package cup 23. Then, the package can 21 including the cathode 22 was put on the package cup 23, and the package cup 23 and the package can 21 were caulked so as to form the secondary battery with a diameter of 20 mm and a height of 2.5 mm. As the electrolyte solution, a solvent including 50 vol % of ethylene carbonate and 50 vol % of diethyl carbonate in which 1.0 mol/dm$^3$ of $LiPF_6$ was dissolved was used.

A charge-discharge test was carried out on each of the obtained secondary batteries of Examples 1 through 15 at 20° C., and the discharge capacity in the first cycle and the capacity retention ratio in the 100th cycle were determined. At that time, charge was carried out at a constant current of 10 mA until the battery voltage reached 4.2 V, then charge was carried out at a constant voltage of 4.2 V until a current reached a predetermined value. On the other hand, discharge was carried out at a constant current of 10 mA until the battery voltage reached 2.5 V. The capacity retention ration in the 100 cycle was determined as a ratio of the discharge capacity in the 100th cycle to the discharge capacity in the first cycle, that is, (discharge capacity in the 100 cycle)/(discharge capacity in the first cycle)×100. The obtained results are shown in Table 1.

As Comparative Examples 1 through 3 relative to Examples 1 through 15, the base materials were formed as in the case of Examples 1 through 15, except that the ratio of tin (the first element) and one kind selected from the group consisting of cobalt, iron and copper (the second element) was changed as shown in Table 1. More specifically, in Comparative Examples 1 through 3, the carbonaceous material was not combined with the base material. Moreover, the coin type secondary battery was formed using each of the base materials of Comparative Examples 1 through 3. The discharge capacity in the first cycle and the capacity retention ratio in the 100 cycle of each of the batteries of Comparative Examples 1 through 3 were determined as in the case of Examples 1 through 15. These results are also shown in Table 1. In addition, Comparative Example 1 corresponds to Examples 1 through 4, 7 through 9, 12 and 13, and Comparative Example 2 corresponds to Examples 5, 10 and 14, and Comparative Example 3 corresponds to Examples 6, 11 and 15.

It was obvious from Table 1 that in Examples 1 through 15, the discharge capacity in the first cycle and the capacity retention ration ratio in the 100th cycle higher than those in Comparative Examples 1 through 3 were obtained. Accordingly, it was found out that when the composite material formed through applying a compressive force and a shearing force to the base material including tin so as to combine the carbonaceous material with the base material was used, the capacity and the cycle characteristics could be improved.

Moreover, it was obvious from Examples 1 through 15 that in Examples 2 through 8, and 10 through 15 in which the mass ratio of the carbonaceous material was within a range of 0.1 to 8.0 inclusive, a discharge capacity in the first cycle of 10 mAh or over, and a capacity retention ratio in the 100th cycle of 90% or over, that is, higher values were obtained. On the other hand, in Example 1 in which the mass ratio of the carbonaceous material was 0.05, the discharge capacity in the first cycle was 9.6 mAh, and the capacity retention ratio in the 100th cycle was 84.2%, that is, the values were lower. Moreover, in Example 9 in which the mass ratio of the carbonaceous material was 10.0, whereas the capacity retention ratio in the 100th cycle was as high as 96.1%, the discharge capacity in the first cycle was as low as 9.5 mAh. Accordingly, it was found out that when the mass ratio of the base material and the carbonaceous material in the composite material was within a range of 0.1 to 8.0 inclusive for the carbonaceous material to 100 for the base material, higher effects could be obtained.

Examples 16 and 17

The composite materials were formed as in the case of Example 3, except that the base material included indium or aluminum (a third element; a Group 13 element except for thallium) in addition to silicon or tin (the first element), and copper or cobalt (the second element) at a ratio shown in Table 2. Moreover, as Comparative Example 4 corresponding to Example 16, the base material was formed as in the case of Example 16. Further, the secondary battery was formed using each of the base materials of Examples 16 and 17 and Comparative Example 4 as in the case of Examples 1 through 15. The discharge capacity in the first cycle and the capacity retention ratio in the 100th cycle of each of the secondary batteries of Examples 16 and 17 and Comparative Example 4 were determined as in the case of Examples 1 through 15. These results are shown in Table 2 together with the results of Example 3.

case where the electrolyte solution which is a liquid electrolyte is used is described, however, instead of the electrolyte solution, any other electrolyte may be used. As the other electrolyte, for example, a gel electrolyte in which a high molecular weight compound holds an electrolyte solution, a solid electrolyte having ionic conductivity, a mixture of the solid electrolyte and the electrolyte solution, or a mixture of the solid electrolyte and the gel electrolyte is cited.

For the gel electrolyte, various high molecular weight compounds which absorb the electrolyte solution to be gelled can be used. As such a high molecular weight compound, for example, a fluorine-based high molecular weight compound such as polyvinylidene fluoride, or a copolymer of vinylidene fluoride and hexafluoropropylene, an ether-based high molecular weight compound such as polyethylene oxide, a cross-link including polyethylene oxide or the like, or polyacrylonitrile is cited. More specifically, in terms of stability of oxidation-reduction, the fluorine-based high molecular weight compound is preferable.

For the solid electrolyte, for example, a solid high molecular weight electrolyte in which electrolyte salt is dispersed in a high molecular weight compound having ionic conductivity, or an inorganic solid electrolyte made of ion conducting glass, ionic crystal or the like can be used. In this case, as the high molecular weight compound, for example, an ether-based high molecular weight compound such as polyethylene oxide, a cross-link including polyethylene oxide or the like, a

TABLE 2

| | BASE MATERIAL | | | | | | | FIRST CYCLE DISCHARGE CAPACITY (mAh) | 100TH CYCLE CAPACITY RETENTION RATIO (%) |
|---|---|---|---|---|---|---|---|---|---|
| | FIRST ELEMENT | | SECOND ELEMENT | | THIRD ELEMENT | | CARBONACEOUS MATERIAL | | |
| | KIND | RATIO (WT %) | KIND | RATIO (WT %) | KIND | RATIO (WT %) | KIND | MASS RATIO | |
| EXAMPLE 16 | Si | 20 | Cu | 60 | In | 20 | ACETYLENE BLACK | 1.0 | 9.8 | 89.0 |
| EXAMPLE 17 | Sn | 72 | Co | 22 | Al | 5 | ACETYLENE BLACK | 1.0 | 11.5 | 94.0 |
| EXAMPLE 3 | Sn | 70 | Co | 30 | — | 0 | ACETYLENE BLACK | 1.0 | 14.1 | 93.8 |
| COMPARATIVE EXAMPLE 4 | Si | 20 | Cu | 60 | In | 20 | — | 0 | 8.3 | 68.0 |

It was obvious from a comparison between Example 16 and Comparative Example 4 that the discharge capacity in the first cycle and the capacity retention ratio in the 100th cycle in Example 16 higher than those in Comparative Example 4 were obtained. Accordingly, it was found out that when the composite material including silicon was used, the capacity and cycle characteristics could be improved.

It was obvious from a comparison between Examples 3 and 17 that the capacity retention ratio in the 100th cycle in Example 17 was higher than that in Example 3. Accordingly, it was found out that when the base material included a Group 13 element except for thallium, the cycle characteristics could be further improved, so it was preferable.

In the above examples, the base material is described with specific examples, however, even if any other base material is used, the similar result can be obtained.

The present invention is described referring to the embodiment and the examples, but the invention is not limited to the above embodiment and the examples, and is variously modified. For example, in the embodiment and the examples, the ester-based high molecular weight compound such as polymethacrylate or the like, an acrylate-based high molecular weight compound, a mixture thereof, or any of the above high molecular weight compounds copolymerized in molecules can be used. Further, as the inorganic solid electrolyte, lithium nitride, lithium iodide or the like can be used.

Moreover, in the embodiment and the examples, the coin type secondary battery is specifically described, however, the invention can be applied to a secondary battery with any other shape such as a cylindrical shape, a button shape, a prismatic shape, or a shape using a laminate film for a package material, or a secondary battery having any other structure such as a spirally wound structure or the like. Further, in the embodiment and the examples, the secondary battery is described, however the invention can be applied to any other battery such as a primary battery or the like.

Further, in the embodiment and the examples, the case where lithium is used as an electrode reacting species is described, however, the invention can be applied to the case where any other alkali metal such as sodium (Na), potassium (K) or the like, alkaline-earth metal such as magnesium, calcium (Ca) or the like, any other light metal such as aluminum or the like, lithium, or an alloy thereof is used, thereby the same effects can be obtained. In this case, the battery can be formed as in the case of the above embodiment, except that the cathode active material, the anode active material and electrolyte salt are appropriately selected depending upon the light metal.

As described above, the anode material according to the invention comprise the composite material formed through applying a compressive force and a shearing force to at least a part of the surface of the base material including at least one kind selected from Group 14 elements except for carbon to combine the carbonaceous material with the base material, so a decline in cycle characteristics by the base material can be prevented by the carbonaceous material. In other words, the cycle characteristics can be improved. Thereby, the ratio of the base material in the anode can be increased, so the capacity can be improved.

More specifically, in the anode material according to the invention, the base material further includes at least one kind selected from the group consisting of scandium, titanium, vanadium, chromium, manganese, iron, cobalt, nickel, copper, zinc, boron, aluminum, gallium, indium and silver, so a change in form according to alloying and decomposition can be inhibited, and charge-discharge reversibility can be improved.

Moreover, in the anode material according to the invention, the mass ratio of the base material and the carbonaceous material in the composite material is within a range of 0.1 to 8.0 inclusive for the carbonaceous material to 100 for the base material, so the capacity and the cycle characteristics can be further improved.

Further, in the battery according to the invention, the anode material according to the invention is used, so a higher capacity and superior cycle characteristics can be obtained.

Obviously many modifications and variations of the present invention are possible in the light of the above teachings. It is therefore to be understood that within the scope of the appended claims the invention may be practiced otherwise than as specifically described.

What is claimed is:

1. An anode material, comprising:
    a composite material including a base material physically bonded by Van der Waals forces to a carbonaceous material,
    wherein,
        the base material includes tin (Sn) and at least cobalt (Co),
        a mass ratio of the carbonaceous material to the base material is in a range from and including 0.1 to and including 8.0 for the carbonaceous material relative to 100 for the base material, and
        the physical bonding of the base material to the carbonaceous material effected by applying a compressive force and a shearing force to at least a part of a surface of a base material when the composite material is formed.

2. An anode material according to claim 1, wherein the base material further includes at least one kind selected from the group consisting of scandium (Sc), titanium (Ti), vanadium (V), chromium (Cr), manganese (Mn), nickel (Ni), copper (Cu), zinc (Zn), boron (B), aluminum (Al), gallium (Ga), indium (In) and silver (Ag).

3. An anode material according to claim 1, wherein the carbonaceous material is acetylene black.

4. An anode material according to claim 1, wherein the carbonaceous material is artificial graphite.

5. An anode material according to claim 1, wherein the carbonaceous material is carbon fiber.

6. A battery, comprising:
    a cathode;
    an anode; and
    an electrolyte,
    wherein,
        the anode comprises a composite material including a base material physically bonded by Van der Waals forces to a carbonaceous material,
        the base material including tin (Sn) and at least cobalt (Co),
        a mass ratio of the carbonaceous material to the base material is within a range from and including 0.1 to and including 8.0 for the carbonaceous material relative to 100 for the base material, and
        the physical bonding of the base material to the carbonaceous material effected by applying a compressive force and a shearing force to at least a part of a surface of a base material when the composite material is formed.

7. A battery according to claim 6, wherein the base material further includes at least one kind selected from the group consisting of scandium (Sc), titanium (Ti), vanadium (V), chromium (Cr), manganese (Mn), nickel (Ni), copper (Cu), zinc (Zn), boron (B), aluminum (Al), gallium (Ga), indium (In) and silver (Ag).

8. A battery according to claim 6, wherein the carbonaceous material is acetylene black.

9. A battery according to claim 6, wherein the carbonaceous material is artificial graphite.

10. A battery according to claim 6, wherein the carbonaceous material is carbon fiber.

* * * * *